US008124948B2

(12) United States Patent
Haumann et al.

(10) Patent No.: US 8,124,948 B2
(45) Date of Patent: Feb. 28, 2012

(54) CEREMONIAL INSTALLATION

(75) Inventors: Philippe Haumann, Modave (BE); Philippe Lange, Liége (BE)

(73) Assignee: Service Public de Wallonie (BE)

( * ) Notice: Subject to any disclaimer, the term of this patent is extended or adjusted under 35 U.S.C. 154(b) by 834 days.

(21) Appl. No.: 11/547,163

(22) PCT Filed: Mar. 31, 2005

(86) PCT No.: PCT/BE2005/000044

§ 371 (c)(1), (2), (4) Date: Sep. 29, 2006

(87) PCT Pub. No.: WO2005/096676

PCT Pub. Date: Oct. 13, 2005

(65) Prior Publication Data

US 2007/0272879 A1 Nov. 29, 2007

(30) Foreign Application Priority Data

Apr. 1, 2004 (EP) .................................... 04007919

(51) Int. Cl.
*G05D 25/00* (2006.01)

(52) U.S. Cl. .......................... 250/494.1; 362/233; 703/3

(58) Field of Classification Search ................ 250/494.1
See application file for complete search history.

(56) References Cited

U.S. PATENT DOCUMENTS 4,980,806 A * 12/1990 Taylor et al. .................... 362/85
5,307,295 A * 4/1994 Taylor et al. ...................... 703/1

* cited by examiner

*Primary Examiner* — Phillip A Johnston

(74) *Attorney, Agent, or Firm* — Womble, Carlyle, Sandridge & Rice LLP

(57) ABSTRACT

Ceremonial installation, comprising a movable object (1), provided with an energy source (4) and a device (6) for actuating the energy source, linked to a computer memory, a programmer (8) of the actuation device and an interface (2) between the programmer and the memory, the actuation device being controlled by a physical separation of the object (1) from a support (2) and/or a physical contact of the object with said support, after said separation and/or a physical and/or chemical parameter of the object or of the environment of the object and/or a defined spatial position of the object.

27 Claims, 2 Drawing Sheets

CEREMONIAL INSTALLATION

FIELD OF THE INVENTION

The invention relates to ceremonial installations or installations for conducting ceremonies.

TECHNICAL BACKGROUND OF THE INVENTION

Conducting ceremonies often makes use of mobile or fixed, sound or light objects, such as, for example, sound transmitters or diffusers, projectors of fixed or variable intensity, light torches or even light sticks held by the people attending the ceremony. Thus, in document GB-A-2 135 536, there are proposed light devices, which react to the intensity of a sound source. In document U.S. Pat. No. 3,737,647, clothes are described that are equipped or decorated with accessories including a light source.

Also proposed are glasses or goblets, the foot or bottom of which is provided with an enclosure containing a light source (FR-A-2 807 282), and drinks containers (glasses, goblets) decorated with light or sound accessories, which react to changes to the physical state of the liquid in the container (U.S. Pat. No. 5,339,548).

Various other movable light objects have been proposed, in particular bottles, lighters, light tubes or sticks, beacons or clothing accessories (FR-A-2 807 281).

These known devices and accessories include button cell or standard electric batteries, that need to be replaced or recharged periodically. To this end, document U.S. Pat. No. 4,344,113 relates to an installation combining light glasses and a support for the periodic recharging, by induction, of a battery housed in the bottom of each glass.

Document WO-03/026358 describes an installation for the radiofrequency control of light sources linked to moving objects such as light sticks or clothing accessories. The light source is initially controlled from a programmer and an interface, according to local parameters such as temperature, noise or the intensity of the local light. This known installation is not suitable for reacting to event-driven parameters associated with the movement of the object and its environment.

Document WO-03/067934 describes an installation for controlling light equipment comprising a large number of individual, scattered and fixed lamps, the control being provided via programmers and interfaces. This known installation is not suitable for controlling moving light equipment or objects.

SUMMARY OF THE INVENTION

The object of the invention is to remedy the limited performance characteristics of the known installations described above, by providing a novel ceremonial installation, comprising movable objects (for example drinks containers), provided with an energy source, said objects having enhanced performance with regard to the ceremonial aspect.

The invention especially relates to an installation of this type, in which said objects are capable of adopting a behaviour that varies according to various circumstances, such as their position in a public, the presence of personalities, the appearance of defined phenomena, and so on, this behaviour also being able to be programmed or modified at will by a user of said installation.

Consequently, the invention relates to a ceremonial installation, comprising

- at least one object, provided with at least one energy source and one device for actuating said source, provided with a memory;
- a programmer for the actuation device; and
- an interface between the programmer and the memory of the actuation device, the installation being characterized in that the object is movable and in that the abovementioned actuation device and its memory are controlled by

- a physical separation of the object from a support; and/or
- a physical contact of the object with said support, after said separation; and/or
- a variation of a physical and/or chemical parameter of the environment of the object; and/or
- a defined spatial position of the object.

In the installation according to the invention, the term "object" denotes any physical object. The expression "movable object" denotes a physical object that is specially designed to be subject to substantial and varied movements during a ceremony, and one of the main technical functions of which is specifically to be subject to such movements during a ceremony. Conversely, the expression "fixed object" denotes a physical object that does not fulfill the technical function defined above of the movable object. It is an object, the position of which is not normally subject to a substantial change during a ceremony or is subject only to sporadic movements.

In the ceremonial installation according to the invention, the movable object can, for example, comprise an object normally worn by a person or by an animal or an object mounted on a carriage that is moved on the floor or in the atmosphere.

The form, the dimensions and the weight of the movable objects are not critical for the definition of the invention and depend on various parameters, particularly the type of ceremony for which it is intended. Examples of movable objects that fall within the scope of the invention include drinks containers (glasses, cups, goblets), items of clothing, clothing decorations, jewelry, mobile signaling systems, torch lamps, light sticks, sound emitters (exemplary and non-exhaustive list).

The movable object of the installation according to the invention is provided with at least one energy source. The expression "energy source" generally denotes any means likely to generate a work. It encompasses in particular acoustic radiation sources, electromagnetic radiation sources, radioactive sources, hydraulic energy sources and calorific energy sources, as well as mechanical or electrical devices likely to generate an instruction for the control of a mechanism present on the object or outside the latter (exemplary and non-exhaustive list).

According to the invention, preference is given to selecting the energy source from acoustic radiation sources and electromagnetic radiation sources. In the case of an acoustic radiation source, the latter can be an ultrasound source, when the object is intended to be located by a receiver sensitive to ultrasounds or by an animal sensitive to ultrasounds (for example, a dog trained to react to ultrasounds). Generally, preference is given to the use of a sound source in the range of frequencies audible to the human ear. In the case of an electromagnetic radiation source, the latter is advantageously a light source. It can be a monochromatic or polychromatic light source, or a laser beam. Invisible radiation sources (for example, in the infrared or ultraviolet spectra) fall within the scope of the invention. In a particular embodiment, the energy source could comprise a flash lamp (of the type of those commonly used in photography) or a pyrotechnic device.

The function of the actuation device is to activate the energy source. It comprises a memory and is generally multifunctional, which means that it is designed to act on one or more parameters of the energy source, according to a defined operating program, contained in its memory. In the particular case of an acoustic or electromagnetic radiation source, these parameters comprise the activation, the frequency and the intensity of the radiation source. A simplified explanatory example of operating program comprises automatically varying the frequency or the intensity of an electric light torch carried by an individual in an auditorium, according to the spatial position of said individual in the auditorium. Detailed examples of defined programs will be explained later.

The function of the programmer is to create the abovementioned operating program and communicate it to the memory of the actuation device. The operating program is normally created by an operator (for example, a person organizing a ceremony). The operating program can be created by combining a series of diverse instructions. It is also possible, according to a particular embodiment of the invention, to select the operating program at the outset from some pre-established programs pre-stored in the programmer. To this end, in a preferred embodiment of the installation according to the invention, the programmer contains a number of pre-stored programs and a device for selecting, as required, one of these pre-stored programs which is then the abovementioned operating program.

Subsequently, the expression "operating program" will denote the program which is located in the memory of the actuation device of the energy source of the object and which controls the operation of this actuation device. The expression "pre-established program" will denote a program created by an operator (an individual or a group of individuals) and the expression "pre-stored program" will denote a pre-established program, stored in the programmer.

The programmer can be movable or fixed, the terms "movable" and "fixed" having the same definitions as those provided above, for the movable object and the fixed object definitions.

As stated above, the memory of the actuation device of the energy source of the movable object contains an operating program. This operating program is used to control the actuation device of said energy source. It has been created in the programmer by assembling instructions (pre-established program) or it has been selected from a list of programs that have been previously stored in the programmer (pre-stored program). The operating program and, where appropriate, the pre-stored programs, then contain a series of instructions that depend on the movable object proper, its destination and its function. As an example, in the case of a movable object intended to be carried in a defined space, the operating program selected in the programmer and transmitted to the memory of the movable object will be different, according to whether this space will be a garden, an open-air property or inside a building. Similarly, the operating program selected in the programmer and transmitted to the memory of the movable object will be different according to whether this movable object is a drinks container intended for a festive ceremony or an electric torch used in a mass demonstration, or even a clothing accessory.

The function of the interface is to transfer the abovementioned operating program from the programmer to the memory of the actuation device of the movable object. The interface can be movable or fixed, the terms "movable" and "fixed" having the same definitions as those provided above, for the movable object and the fixed object definitions. Moreover, the interface can be linked removably or permanently to the programmer. In the case of a permanent link, the programmer can be an integral part of the interface. It is preferable, however, according to a variant of the invention, for the programmer to be separate from the interface and for it to be linked removably, to be able to be separated from it.

Any appropriate interface for the transfer of signals containing data or instructions can be used, within the scope of the invention. The selection of the most appropriate interface will depend on the movable object and the programmer and it may differ according to whether the programmer is movable or fixed, according to whether the interface is movable or fixed and according to whether the programmer and according to whether the interface is linked removably or permanently to the programmer.

According to the invention, the actuation device of the energy source is managed by a defined control means.

In a first embodiment of the invention, said control device comprises a physical separation of the movable object from a support. In the rest of this specification, the expression "physical separation" should be considered in a broad sense to include the case where the object physically touches the support before being separated from it and the case where it does not touch it. In this embodiment of the invention, the support will depend on the nature of the movable object and the circumstances in which the installation is used. For example, in the case where the movable object is a clothing decoration (for example, an item of jewelry), the support may be a box for the clothing decoration (the item of jewelry). In the case where the movable object is a drinking glass, the support may consist of a tray supporting the glass.

In a second embodiment of the invention, said control means comprises a physical contact of the object with the abovementioned support, which follows a separation of the object from the support. In the rest of this memory, the expression "physical contact" should be considered in a broad sense to include the case where the object physically touches the support and the case where it approaches the latter without touching it. This embodiment is applicable to the case where the movable object is a glass for drinks and where the support is a tray intended to support the glass.

In a third embodiment of the invention, the control means comprises a variation of a physical and/or chemical parameter of the environment of the object. The environment denotes the vicinity or the surroundings of the movable object, for example the ambient air, the presence of fixed or mobile things, animals or people near the object, gas emanations near to the object, the presence of irregularity in the contours or of a sheet of water (exemplary and non-exhaustive list). The environment of the movable object obviously varies according to the movement of the object.

Examples of physical parameters include temperature, pressure and time, whereas examples of chemical parameters include the chemical composition of the ambient atmosphere.

In a fourth embodiment of the invention, the control means comprises a spatial position of the movable object. This spatial position is normally defined relative to one or more beacons, which can be fixed or mobile.

In a particular embodiment of the installation according to the invention, the abovementioned interface comprises a straightforward or induction-based electrical coupling between the programmer and the memory of the actuation device. In this embodiment of the invention, the interface comprises a physical surface, against which the movable object is physically applied. This physical surface can generally comprise a support made of metal or another material, the form and the dimensions of which are suited to those of the movable object. This surface can then include electrical connectors intended to cooperate with complementary electrical connectors on the movable object. As a variant, it can include one or more electrical induction loops, intended to cooperate with one or more induction loops of the movable object. The physical contact between the movable object and the surface must be removable. The material in which this surface is made, its form and its dimensions are not critical for the definition of the invention and they will in particular depend on the shape of the movable object, its destination and its function, and on the electrical coupling mode. In this particular embodiment of the invention, the interface can advantageously comprise the support mentioned above, with reference to the first and second embodiments of the invention. When operating this particular embodiment of the invention, the programmer and the interface are linked to the mains electrical network, the movable object is placed in physical contact with the interface-forming support and an operating program is selected from a list of programs pre-established and pre-stored in the programmer, so that it can subsequently be transferred to the memory of the actuation device of the energy source of the movable object via the interface (the support). The link between the programmer and the memory of the actuation device is obviously eliminated when the movable object is physically separated from the interface support. It follows that, from this moment, the program of the actuation device is fixed and, if it needs to be modified, the movable object must be physically linked again to the interface support. For example, in the particular case where the movable object is a drinks container, (for example a glass), the support forming the interface can be a tray or a surface on which a cloth has been placed or a sheet has been glued (for example, a self-adhesive sheet) provided with straightforward electrical contacts or, preferably, induction loops to support the drinks container.

In a variant of the particular embodiment that has just been described, straightforward or induction-based electrical coupling of the interface is replaced wholly or partly by a local generator of electromagnetic waves of limited and well-defined range, and the object is provided with a receiver of said electromagnetic waves.

In a specially advantageous embodiment of the installation according to the invention, the programs are transferred by means of an energy-wave interface. To this end, the movable object is equipped with a receiver of energy waves and at least one beacon comprising a transmitter of energy waves and a memory that has stored an instruction created using the programmer is involved. The link between the memory of the actuation device of the energy source of the movable object and the beacon is via energy waves.

According to the invention, an energy-wave link consists in a transmission of energy which is mainly performed without involving a physical connection by wires, cables or similar. The energy waves providing this communication can comprise sound waves. They preferably comprise electromagnetic waves, especially radiofrequency waves of the type of those commonly used in radio links. VHF and UHF waves are perfectly suitable. Laser-beam links can also be appropriate.

The use of a beacon for the interface makes it possible in particular to determine at any time the position of the movable object according to that of the beacon. To this end, the known method, which consists in equipping the beacon with a pulse counter and sending electromagnetic signals from the transmitter of the beacon to the receiver of the movable object at defined time intervals, can advantageously be applied.

In a particular variant of the advantageous embodiment described above, the beacon can replace an active operating program of the movable object with another operating program.

In the advantageous embodiment described above and its particular execution variant, the operating program can have added to it a spatialization table and/or a topography table. The spatialization table comprises a series of parameters that are selectively activated to control the actuation device of the movable object, in response to the instructions transmitted by the beacon and relative to the spatial coordinates of the movable object. Under the effect of this control, the energy source will produce a work defined by the actuation device, according to the relative spatial coordinates of said movable object. The topography table comprises a series of parameters that are activated selectively to control the actuation device of the movable object, in response to the instructions transmitted by the beacon and relative to information related to the topography of the premises, such as different levels or floors of a building or obstacles to the normal movement of the participants in the environment where the ceremony is being held. These obstacles can, for example, comprise walls, staircases, gradients, lowered ceilings, statues or other decorations, plant pots, water bowls, fountains, etc. For example, in the case where the energy source of the movable object comprises an acoustic or electromagnetic radiation source, the abovementioned control will act on the frequency and/or the intensity of the acoustic or electromagnetic source as a function of the spatial coordinates of the movable object (in the case of a spatialization table) or as a function of the presence of a defined obstacle in the vicinity of the movable object (in the case of a topography table).

The specially advantageous embodiment described above and its particular execution variant have the particular feature that they make it possible to maintain a link between the programmer and the memory of the movable object., even in the case where the movable object and/or the programmer are/is moved. It makes it possible in this way to modify, permanently and at will, the operating program included in the memory of the movable object or to send to the latter specific instructions, to adapt the function of the actuation device of the energy source according to various circumstances that would not have been pre-programmed such as, for example, the spatial position or geography of the movable object, the appearance of an unexpected or particular phenomenon, the unforeseen arrival of local or chance information, a variation in the ambient pressure or temperature, or in the ambient lighting (exemplary and non-exhaustive list).

In another particular execution variant of the advantageous embodiment described above, the movable object can, if necessary, comprise a transmitter of energy waves and the beacon can, if appropriate, comprise a receiver of energy waves. In this variant of embodiment of the invention, the transceiver of the movable object and the transceiver of the beacon can dialogue such that the abovementioned actuation device of the movable object reacts to signals from the beacon, said signals being controlled from information transferred by the transmitter of the movable object to the receiver of the beacon.

In a preferred execution variant of the specially advantageous embodiment defined above, the installation comprises at least two beacons networked together (by means of dedicated cables, by means of mains electricity network cables or by means of transmission by energy waves), each beacon comprising a transceiver of energy waves and a memory as explained above. One way of implementing the network comprises a scanning of the movable object, in turn, by the transmitter of each beacon, acting individually. For example, in the case where the installation comprises, on the one hand, five movable objects, each provided with a radiation source and a receiver and, on the other hand, four beacons, each provided with a transmitter, the receiver of each movable object (considered individually) is scanned by a succession of four individual signals, originating respectively, successively and in a predefined order from the beacons. This execution variant of the invention is not, however, limited to this embodiment of the network, other known methods being able to be substituted for it, for example a network with a protocol allowing collisions.

In this preferred execution variant of the invention, the actuation device of the movable object is controlled by the transmitters of the programmer, so as to obtain a regulation of the energy source, according to the position of the movable object relative to each beacon. For example, in the case where the energy source is a source of electromagnetic radiation, the regulation will act on the frequency or the amplitude of the radiation so that it is modified in a predetermined direction (for example, progressively increases) when the movable object moves away from a beacon and approaches another beacon, and vice versa. In the case of a movable object having several energy sources (for example, several sources of electromagnetic radiation), these energy sources can be controlled according to different procedures, when the spatial position of the movable object relative to the beacons changes, these procedures being governed by the abovementioned pre-established program. For example, in the case of two sources of electromagnetic radiation, the frequency and/or the intensity of one of the sources will vary according to the spatial position of the movable object relative to one of the beacons, whereas the frequency and/or the intensity of the other source will vary according to the spatial position of the movable object relative to another beacon. The installation conforming to this variant of the invention comprises at least two beacons. It can comprise a greater number of beacons (the number of beacons not being critical) scattered in the space where the ceremonial event is taking place, randomly or in a predefined manner. The beacons can equally well be all fixed or all movable; as a variant, some of them can be fixed, while others are movable.

In an additional execution variant of the specially advantageous embodiment described above, the energy-wave link between the receiver (or, where appropriate, the transceiver) of the movable object and the transmitter (or, where appropriate, the transceiver) of one or more beacons, passes through at least one relay equipped with a transceiver of energy waves (for example, a radio wave relay). This variant of the invention is of interest in the case of installations for which movable objects or beacons are intended to be disposed or moved over a large surface area or one that has natural or artificial obstacles to the propagation of the energy waves.

In an additional execution variant of the specially advantageous embodiment described above, the installation also comprises a control device, designed to transfer one-off instructions to the actuation device of the movable object in addition to those of its memory or after short-circuiting the latter. This embodiment of the invention requires the movable object and the or each beacon of the interface to comprise transceivers of energy waves. In a particular case of this additional embodiment of the invention, the installation allows said control device to cooperate with a specific movable object defined by a serial number in order to transfer instructions to this movable object.

In an additional embodiment of the installation according to the invention, the energy source of the movable object comprises a relay. In this embodiment of the invention, the relay is intended to actuate a mechanism present on the movable object or separate from the latter, in response to an instruction originating from the actuation device.

In an additional embodiment of the installation according to the invention, the movable object comprises a second memory, the function of which is to memorize and store parameters of the environment of said movable object, obtained by means of sensors or other equivalent means, and the spatial position of said object relative to one or more beacons, said second memory being able to be read via the interface. This additional embodiment of the installation allows for traceability of the object. It makes it possible to monitor the movement of the object and therefore finds an application in ensuring the traceability of the object or the security of the object and/or its user and/or its environment. In some cases, the object can take the initiative in communicating to the interface the data contained in this second memory, or transmitting to the interface, directly and in real time, the data that it collects.

When the installation according to the invention comprises a large number of movable objects as defined above, intended for a large public, it may prove interesting to mark the movable objects to be able to locate them and recover them. To this end, in a particular embodiment, the installation comprises a unit for marking said movable objects. In this embodiment of the invention, it may prove advantageous for the installation also to comprise a unit for marking its other components, such as the programmer and the interface. This particular embodiment of the invention makes it possible to differentiate the elements of an installation according to the invention, from corresponding elements of another installation conforming to the invention. It thus avoids an element of a defined installation (for example, an object or a beacon) being able to be replaced by a corresponding element of another installation. The invention can provide for a procedure enabling differently marked elements to be able to be used simultaneously in one and the same installation as if they were all marked in the same way.

In the installation according to the invention, the movable object must be equipped with a standalone electricity generator, to be able in particular to operate its actuation device. Similarly, in the case where the programmer is movable, it must normally be equipped with a standalone electricity generator. The same applies for the interface if the latter is movable or separable from the programmer.

This standalone electricity generator of the movable object and, where appropriate, of the programmer and/or of the interface is not critical for the definition of the invention. Its choice will depend on various parameters, such as the nature, the form, the dimensions and the intended use of the movable object (and, where appropriate, of the programmer and/or of the interface). It can be an AC current generator or a DC current generator. Depending on circumstances, the standalone electricity generator can, for example, be chosen from electrical batteries, fuel-cell batteries and electrical accumulators (such as capacitors and rechargeable electrical batteries).

When they are fixed, the programmer and the interface can be equipped with a standalone electricity generator or be linked to the mains electricity network.

In a particular embodiment of the installation according to the invention, the abovementioned interface comprises a straightforward or induction-based electrical coupling as defined above and an energy-wave link (involving one or more beacons and, where appropriate, one or more relays, these elements having been defined and explained above).

This embodiment is well suited to installations which include rechargeable electrical accumulators and units for marking its components. The straightforward or induction-based electrical coupling is then used for marking the components and coupling the electrical accumulators to an electrical charger, while the energy-wave link is used to place the programmer in communication with the memory of the actuation device of the movable object.

In a modified embodiment, the straightforward or induction-based electrical coupling is also used to place the programmer in communication with the memory of the actuation device of the movable object. In this modified embodiment of the invention, the electrical coupling is used to transfer an operating program into said memory, from a program pre-established and pre-stored in the programmer, whereas the link via beacons and energy waves is used, while the installation is being used, to adapt this operating program in real time or to send it instructions specific to local circumstances such as ambient pressure and temperature, ambient light, the spatial position of the movable object, the presence of natural or artificial obstacles, the topography of the premises (exemplary and non-limiting list).

In the installation according to the invention, the movable object can, if appropriate, comprise one or more sensors, the technical function of which is to enable the abovementioned operating program, stored in its memory, to react independently on the actuation device of the energy source of this movable object, in response to local parameters (for example, the light intensity of the premises, a modification of this light intensity or, in the case of a drinks container, the level of liquid that it contains). As a variant, the operating program can be designed to transfer these local parameters to the interface, such that the latter can then send particular instructions to the actuation device of the energy source of the movable object.

For the electronics of the installation according to the invention, preference is given to the choice of small and low-energy-consumption components. The invention thus makes it possible to miniaturize the components of the installation and reduce its electrical consumption, both while it is active and while idle.

The installation according to the invention finds applications in a variety of public or private ceremonies, such as, for example, performances, religious or lay ceremonies, marriages, fairground fêtes, receptions for personalities, conferences, artistic, cultural, commercial or advertising events or mass demonstrations (non-exhaustive list). It can also be used customarily in bars, restaurants, hotels, discotheques, etc.

The installation according to the invention finds a particular application in the case where the movable object is a drinks container, of which at least a part of the wall is translucent (for example, a glass or a cup) and where the energy source comprises a light source. In this particular application of the invention, the interface can, for example, comprise a tray used to support the drinks container or a cloth or a sheet fixed (for example glued) onto an appropriate support, this tray, this cloth or this sheet comprising electrical contacts or induction loops intended to cooperate with corresponding electrical components on the drinks container. As a variant, instead of the electrical contacts and induction loops (or in addition to the latter), the tray, the cloth or the sheet can comprise a generator of electromagnetic waves of limited and well-defined range, the drinks container then being provided with a receiver of said electromagnetic waves.

In this advantageous embodiment of the invention, the operating program selected by the programmer and transferred into the memory of the drinks containers modifies the light transmitted in the container when the latter leaves the interface, or when it is placed on said interface, or even when the container is moved in a room or over a space, for example in a crowd.

The design of the ceremonial installation according to the invention can be transposed to all non-ceremonial installations, for example public or industrial installations, comprising:

- at least one object, provided with at least one energy source and one actuation device of said source, provided with a memory;
- a programmer of the actuation device; and
- an interface between the programmer and the memory of the actuation device, the installation being characterized in that the object is movable and in that the abovementioned actuation device and its memory are controlled by:

- a physical separation of the movable object from another object; and/or
- a physical contact of the movable object with said other object, after said separation; and/or
- a physical and/or chemical parameter of the environment of said movable object; and/or
- a defined spatial position of the movable object.

In the installation according to the invention, it is important to give the expressions “movable object”, “fixed object”, “physical separation” and “physical contact” the definitions that were given to these expressions in the case of the ceremonial installation according to the invention.

In a preferred embodiment of the installation according to the invention, the movable object comprises a second memory, the function of which is to memorize and store parameters of the environment of said movable object, obtained by means of sensors or other equivalent means, and the spatial position of said object relative to one or more beacons, said second memory being designed to be read by the interface. This preferred embodiment of the installation makes traceability of the object possible. It makes it possible to monitor the movement of the object and therefore finds application in ensuring the traceability of the object or the security of the object and/or its environment. In some cases, the object can take the initiative in communicating to the interface the data contained in this second memory or transmitting to the interface, directly and in real time, the data that it collects.

BRIEF DESCRIPTION OF THE DRAWINGS

Particular features and details of the invention will become apparent from the following description of the appended figures, which represent a few particular embodiments of the invention.

In these figures, the same reference numbers denote the same elements.

DETAILED DESCRIPTION OF THE INVENTION

Figure 1:
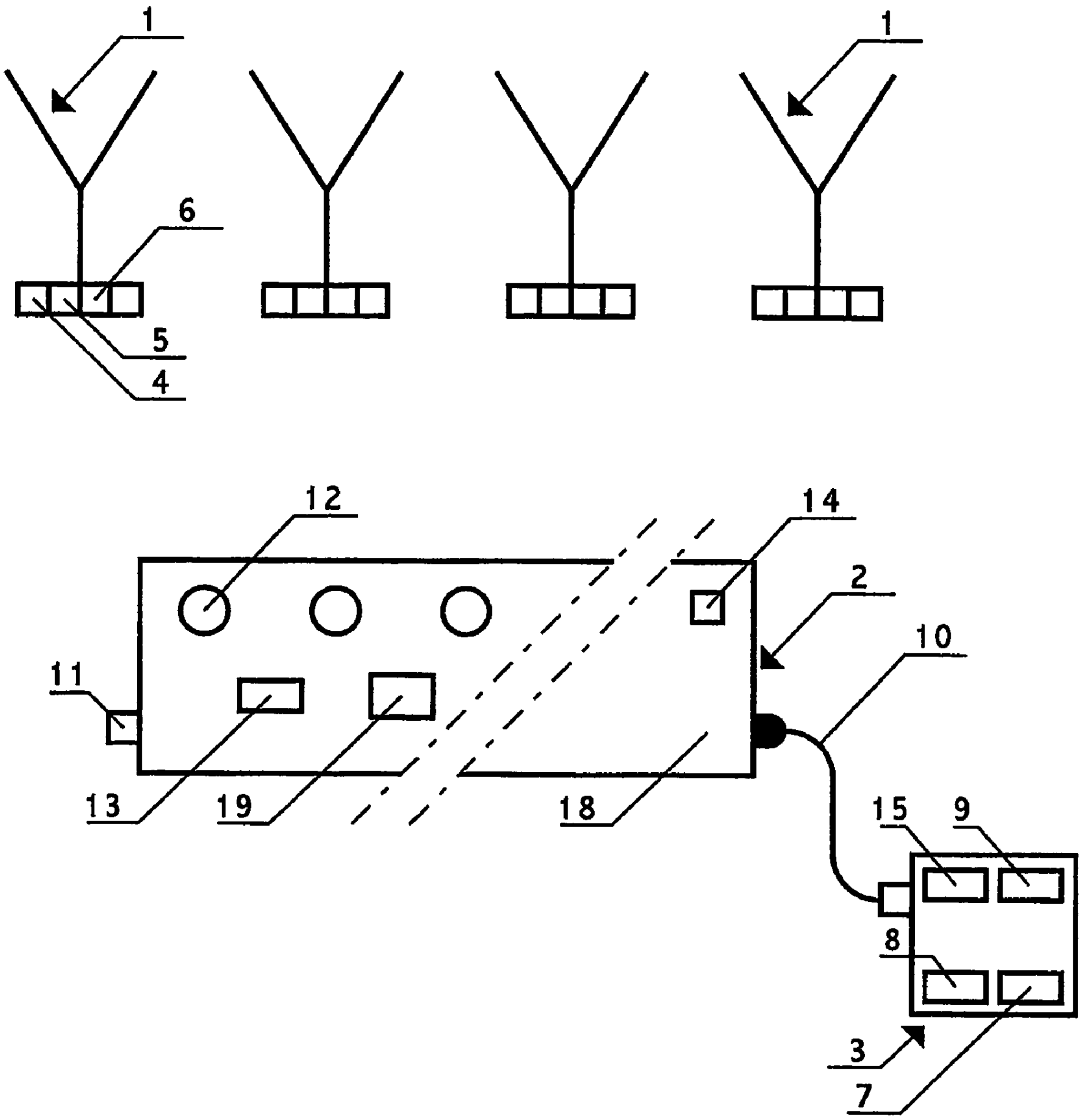
FIG. 1 is a block diagram of a first embodiment of the installation according to the invention.

The installation represented in FIG. 1 comprises

- a series of glasses 1 used for intaking drinks;
- an interface 2, comprising a tray 18 supporting the glasses 1; and
- a control module 3, the function of which will be explained below.

The glasses 1 are equipped with a polychromatic light source 4, a battery 5 and an actuation device 6 of the polychromatic source 4. They also comprise a set of electronic circuits, not shown, including a circuit for monitoring the charge of the battery and a memory associated with the actuation device 6 and intended to contain an operating program for operating and controlling this actuation device.

The control module 3 comprises a battery charger 7, a programmer 8 and a device 9 for marking the glasses 1 and the tray 18. The programmer 8 comprises a list of pre-established and pre-stored programs. A switch 15 is used to select an operating program from this list of pre-stored programs according to choice. A removable electrical connection 10 links the module 3 to the tray 18.

The tray 18 comprises a connector 11 for connecting it to the electrical power supply network, electrical induction loops 12, an electrical battery 13, a memory 19 and a function switch 14. The number of induction loops 12 is normally equal to the number of glasses 1, although this is not essential.

The use of the installation of FIG. 1 comprises the following steps.

In a first step, the glasses 1 are placed on the tray 18, with their respective bases on top of the induction loops 12, the switch 14 is set to the "charge" mode and the connector 11 is connected to the electricity network. The installation is maintained in this state for sufficient time to charge the batteries 15 and 13 from the electrical power supply 11. When the batteries are sufficiently charged, the switch 14 is operated to connect the marking device 9 to the tray 18 and thus assign the glasses 1 and the tray 18 an identification code.

In an auxiliary step, which follows the marking operation of the first step, a switch 15 of the control module 3 is operated, to select an operating program from the abovementioned list of pre-stored programs and send it to the tray 18 which places it in memory.

In a second step, which follows the first step and the auxiliary step, the switch 14 of the tray 18 is operated to place it in a position for which the operating program selected in the abovementioned auxiliary step is transferred into the memory of the actuation device 6 of the glasses 1. After this step, the light source 4 of the glasses 1 adopts a behaviour imposed by the actuation device 6, which acts in response to an instruction from the operating program in its memory (the light source 4 emits, for example, a monochromatic light in a defined range of frequencies and with a defined intensity). The electrical connection 10 is removed. The tray 18 and the glasses 1 are then ready for use in a ceremony.

In a third step, the connector 11 is disconnected from the electrical network and the tray 18 is circulated among the people attending the ceremony (for example, guests in the case of a festive ceremony), so that they remove a glass from the tray, in turn. As soon as a glass leaves the tray, the frequency of the light that it emits changes, by action from the actuation device 6, controlled by the operating program in its memory.

In a fourth step, the frequency or the intensity of the light source 4 of the glasses changes in response to the variation of one or more particular parameters, such as, for example: elapsed time, the position of the glass or the lighting of the premises (non-exhaustive list).

In a fifth step, corresponding to the return of the glass 1 to the tray 18, the frequency of its light source will change once again, to adopt a value making it possible to distinguish between it (glass resting on the tray 18 after use) and the full glasses that are on the tray and that have not yet been used.

A sixth step corresponds to the washing of the glasses, after the reception. In this step, when a glass having been subjected to the fifth step leaves the tray, the actuation device 6 cuts the electrical connection from its battery to its light source.

The programming (the operating program in the memory of the actuation device 6) also includes an accessory step, between the third and the fourth steps, which corresponds to the case where a glass is returned to the tray, immediately after having been removed from it, without having been emptied. During this accessory step, the light source adopts a distinctive behaviour, for which, for example, the light emitted by its source blinks. This accessory step makes it possible to distinguish two categories of full glasses on the tray 18 (the original glasses and those that have already passed through the hands of the guests) and makes it possible to immediately remove the second category of glasses from the tray.

Figure 2:
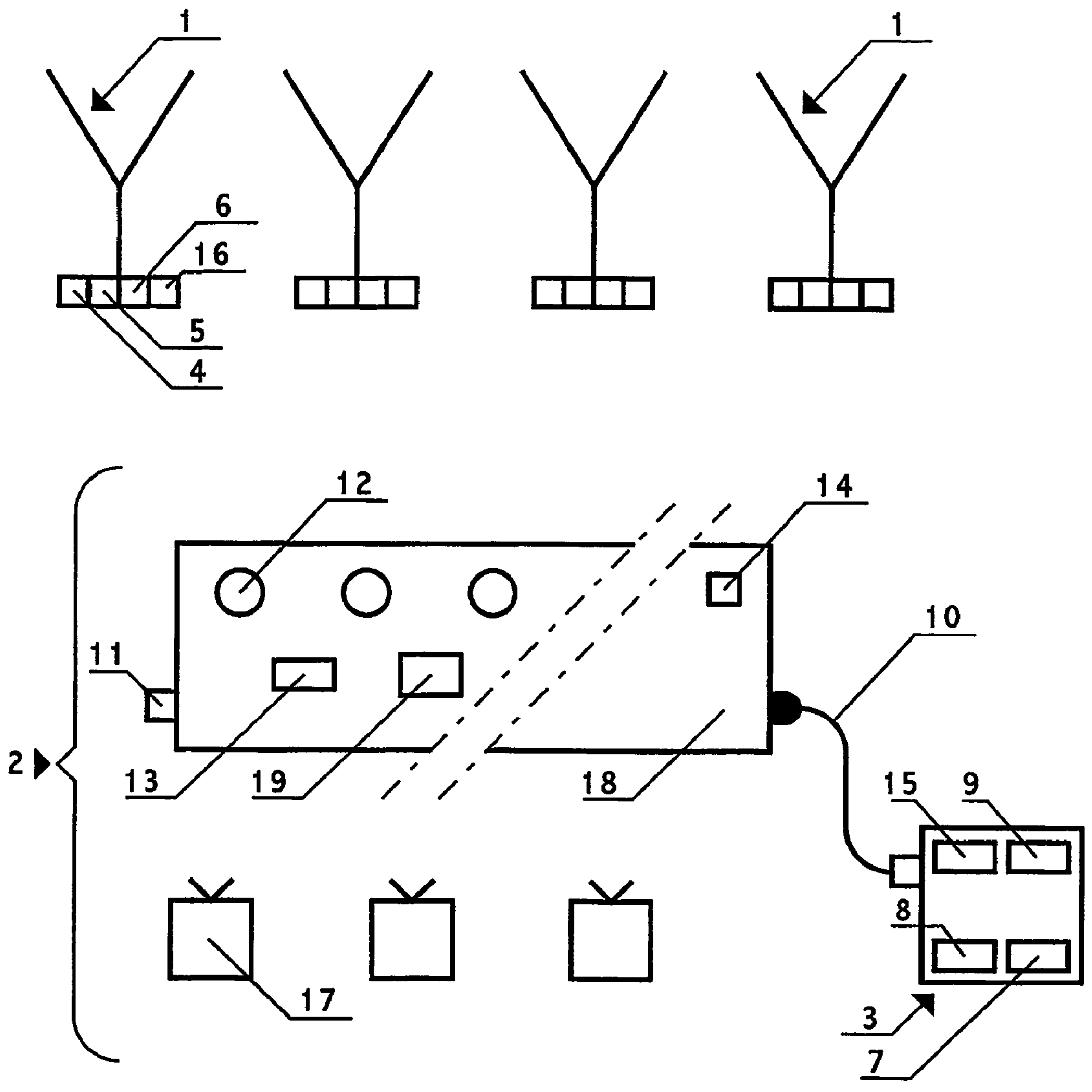
FIG. 2 is a block diagram of a second embodiment of the installation according to the invention.

In the installation of FIG. 2, the glasses 1 are equipped with a radiofrequency wave transceiver 16 and the interface 2 comprises, in addition to the tray 18, beacons 17, each equipped with a radiofrequency wave transceiver.

The beacons 17 of the interface 2 are scattered in the environment where the ceremony is being held (its environment can be, for example, a room or a space in the open air). They are designed and programmed to dialogue with the transceivers 16 of the glasses 1 and with the programmer 8 of the control module 3. To this end, they are linked to the control module 3 by an electrical wiring or by radiofrequency waves. In the case of a link by radiofrequency waves, the control module 3 is equipped with a radiofrequency wave transceiver (not shown) and the beacons 17 comprise an electrical battery or are linked to the mains electricity network.

When using the installation of FIG. 2, the tray 18 is used to mark the glasses 1, the tray 18 and the beacon 17, and to charge the batteries 5 and 13 and, where appropriate, those of the beacons 17. The transfer of the operating program into the memory of the actuation device 6 of the glasses 1 from the pre-stored programs of the programmer 8 is performed via the induction loops of the tray 18 or via radiofrequency waves between the transceivers of the beacons 17 and the transceivers 16 of the glasses 1. To this end, the or each beacon 17 sends its instructions to the transceivers 16 of the glasses 1, in a predetermined logical order. The information received is interpreted by the operating program of the glasses 1 which will control the actuation device 6 of each glass according to instructions in the pre-stored program that has been selected in the programmer 8. For example, the operating program of one of the glasses 1 will calculate the position of said glass relative to the beacons 17 and control the actuation device of its light source according to instructions in the pre-stored program selected and memorized in its memory.

In the installation of FIG. 2, the transceiver 16 of each glass 1 is normally scanned by a succession of radiofrequency signals which are sent successively by the transceivers of the beacons 17, in a predetermined logical order. The most appropriate scanning mode will depend on the local circumstances and the means for implementing it can be determined in each particular case by a person skilled in the art.

In a particular embodiment of the installation of FIG. 2, the pre-stored programs of the programmer 8 (or some of them) comprise a spatialization table and a topography table. The spatialization table comprises a series of parameters that are activated selectively to control the actuation device 6 of the glasses 1, in response to radiofrequency signals sent by the transceivers of the beacons 17 and received by the transceivers 16 of the glasses 1 and analyzed to determine, among other things, the spatial coordinates of the latter. Under the effect of this control, the frequency and/or the intensity of the light from the glasses will be modified according to the relative spatial coordinates of the glasses. The topography table comprises a series of parameters that are activated selectively to control the actuation device 6 of the glasses 1, in response to radiofrequency signals transmitted by the transceivers 17 and received by the transceivers 16 of the glasses 1 and relative to information relating to the topography of the premises, such as obstacles to the normal circulation of the participants in the environment where the ceremony is being held. These obstacles can, for example, include walls, staircases, gradients, lowered ceilings, statues or other decorations, plant pots, water bowls, fountains, etc.

In the installation of FIG. 2, the beacons 17 of the interface 2 can be fixed. This embodiment of the installation makes it possible in particular for the users of the glasses to identify their position in a space, by viewing the colour or information appearing on their glass. As a variant, the beacons 17 of the interface 2, or some of them, can be mobile. It is possible, for example, to imagine certain people attending a ceremony carrying a beacon 17, enabling them to be followed for trace purposes, by viewing the colour of the light from the glasses of other participants located in their immediate vicinity.

The invention claimed is:

1. An installation comprising:

at least one movable object, the movable object moving about a space between a first spatial location within the space, defined by a first set of spatial coordinates, and at least one different, second spatial location within the space, defined by a second set of spatial coordinates, during a ceremony, the movable object being provided with at least one energy radiation source and an actuation device for actuating said at least one energy radiation source, provided with a memory, at least two coordinates of the first set of spatial coordinates each differ from a respective corresponding coordinate of the second set of spatial coordinates;

a programmer for the actuation device; and an interface between the programmer and the memory of the actuation device, for transferring an operating program from said programmer to said memory of the actuation device, wherein the interface comprises an energy-wave link between a transmitter of said energy-waves, mounted on a beacon and a receiver of said energy-waves carried by the movable object, and in that the actuation device and an actuation device memory are controlled by a spatial position of the movable object relative to the beacon, said spatial position of the movable object being calculated at any time by the operating program in response to instructions sent by the beacon, and wherein the relative spatial coordinates of the object are determined through the use of spatialization and topography tables contained in the operating program.

2. Installation according to claim 1, wherein the actuation device and the memory are controlled in response to instructions transmitted by the beacon and relative to the spatial coordinates of the movable object.

3. Installation according to claim 2, wherein the programmer includes a program containing a spatialization table comprising parameters in relation to the spatial coordinates of the movable object.

4. Installation according to claim 1, wherein the actuation device and the memory are controlled in response to instructions transmitted by the beacon and relative to a topography of the environment of the movable object.

5. Installation according to claim 4, wherein the programmer includes a program containing a topography table comprising parameters relating to said topography of the environment of the movable object.

6. Installation according to claim 1, wherein the movable object comprises an energy-wave transmitter and the beacon comprises a receiver of said energy waves, and in that the actuation device of the movable object is controlled by information transferred from the transmitter of the movable object to the receiver of the beacon.

7. Installation according to claim 6, wherein said installation comprises at least one second beacon equipped with a transmitter and a receiver of the energy waves, the two beacons establishing a network and being networked together.

8. Installation according to claim 7, wherein the network is of the collision type.

9. Installation according to claim 7, wherein the network is of the scanning type.

10. Installation according to claim 1, wherein said installation comprises sensors of parameters of the environment of the movable object, and in that the abovementioned actuation device and its memory are controlled by a variation of a physical and/or chemical parameter of said environment.

11. Installation according to claim 6, wherein the movable object comprises a second memory, the function of which is to memorize the spatial position of said movable object relative to the or each beacon, said second memory being designed to be read via the interface.

12. Installation according to claim 11, wherein when said installation comprises sensors of parameters of the environment of the movable object, the second memory is designed to memorize said environment parameters.

13. Installation according to claim 1, wherein each beacon comprises a pulse counter, designed to send energy signals from the transmitter of the beacon to the receiver of the movable object, at defined time intervals.

14. Installation according to claim 1, wherein the actuation device and actuation device memory are controlled by a physical separation of said movable object from a second object or by a physical contact of the movable object with said other object, after said separation.

15. Installation according to claim 14, wherein said second object is a support for the movable object.

16. Installation according to claim 1, wherein the programmer and/or the beacon is movable.

17. Installation according to claim 1, wherein the energy-wave link between the receiver of the movable object and the transmitter of the beacon passes through at least one relay equipped with an energy-wave transceiver.

18. Installation according to claim 1, wherein the energy radiation source of the movable object comprises an acoustic and/or electromagnetic radiation source, and the actuation device is designed to act on the activation, the frequency and/or the intensity of the radiation.

19. Installation according to claim 18, wherein the movable object is selected from a light stick and/or a clothing accessory and the energy radiation source comprises at least one light source.

20. Installation according to claim 18, wherein the movable object is a drink container and at least a part of a wall of a drink container is translucent, and the energy radiation source of said movable object comprises at least one light source.

21. Installation according to claim 18, wherein the energy radiation source of the movable object comprises a light source, and in that said movable object comprises at least one light projector.

22. Installation according to claim 18, wherein the energy radiation source of the movable object comprises at least one acoustic radiation source, and in that said movable object is a sound diffuser.

23. Installation according to claim 1, wherein the installation comprises a unit for marking the movable object and/or each beacon.

24. Installation according to claim 1, wherein the energy waves and signals are electromagnetic waves and signals, respectively.

25. Installation according to claim 1, wherein the installation is a ceremonial installation.

26. Installation according to claim 1, wherein the movable object is located inside a building.

27. Installation according to claim 1, said movable object moving between the first spatial location and a plurality of subsequent spatial locations defined by respective sets of spatial coordinates during the ceremony.

* * * * *